United States Patent [19]

Reimer

[11] Patent Number: 4,943,080
[45] Date of Patent: Jul. 24, 1990

[54] SWATHER HITCH DEVICE FOR PULL-TYPE IMPLEMENTS

[76] Inventor: Alden L. F. Reimer, Box 58, Neville, Saskatchewan, Canada, S0N 1T0

[21] Appl. No.: 395,460

[22] Filed: Aug. 18, 1989

[30] Foreign Application Priority Data

Aug. 24, 1988 [CA] Canada .................................. 575598

[51] Int. Cl.⁵ .............................................. B60D 1/34
[52] U.S. Cl. .............................. 280/455.1; 280/446.1; 280/488
[58] Field of Search ............... 280/446.1, 455.1, 456.1, 280/459, 461.1, 406.1, 407, 413, 457, 460.1, 472–474, 479.3, 483, 488; 172/677, 678, 314

[56] References Cited

U.S. PATENT DOCUMENTS

| | | |
|---|---|---|
| 944,899 | 12/1909 | Mullin . |
| 2,225,130 | 10/1939 | Otto ...................................... 280/487 |
| 2,281,059 | 4/1942 | Anderson et al. . |
| 2,311,859 | 2/1943 | Oehler ................................. 280/472 |
| 2,551,456 | 5/1951 | Oerman ............................... 172/678 |
| 2,596,902 | 4/1948 | Krause ................................. 280/472 |
| 3,523,410 | 8/1970 | Taylor et al. . |
| 3,531,139 | 9/1970 | Hedgepeth . |
| 3,787,077 | 1/1974 | Sanders . |
| 3,957,286 | 5/1976 | Goodwin . |
| 4,582,337 | 4/1986 | Hsueh ............................... 280/455.1 |

FOREIGN PATENT DOCUMENTS

| | | |
|---|---|---|
| 1158867 | 12/1983 | Canada . |
| 575609 | 8/1924 | France ................................ 280/488 |

Primary Examiner—Charles A. Marmor
Assistant Examiner—Victor E. Johnson
Attorney, Agent, or Firm—Murray E. Thrift; Stanley G. Ade; Adrian D. Battison

[57] ABSTRACT

A control device is mounted on the tongue of a drawn implement, normally an implement that extends to one side of the tongue. The control device includes a strut that is mounted on the tongue of the towed implement and projects laterally from the tongue, to the side away from the projection of the implement itself. A stabilizer tongue is slideably connected to the strut and is connected at its front end to a second, rigid hitch beside the hitch for the implement tongue. Springs act between the strut and the stabilizing tongue to resist movement of the stabilizing tongue with respect to the strut. The control device balances the tendency of the offset implement to move laterally when towed and improves its steering characteristics.

13 Claims, 3 Drawing Sheets

SWATHER HITCH DEVICE FOR PULL-TYPE IMPLEMENTS

FIELD OF THE INVENTION

The present invention relates to hitches for pull-type implements for agricultural and other uses.

BACKGROUND

Pull-type implements, for example pull-type swathers, pull-type combines, rock pickers, etc. with an extension or platform on one side of the tongue have a tendency to pull back or drag because of the extension. The present invention is concerned with the provision of a control device that stabilizes such an implement against lateral movement to the extended side and assist in steering.

SUMMARY

According to the present invention there is provided a towed implement control device for an implement with an implement tongue at one side thereof, the tongue having a hitch for connection to the draw bar of a towing vehicle, said control device comprising:

a strut pivotally mounted on the implement tongue and projecting laterally from the tongue to a side thereof opposite the implement;

a control tongue extending along the side of the implement tongue opposite the implement and slideably connected to the strut;

control hitch means pivotally connecting the control tongue to the towing vehicle at a position adjacent the draw bar hitch;

spring means acting between the control tongue and the strut to resist relative sliding movement of the control tongue and the strut; and a beam pivotally connected to the strut and pivotally connected to the implement tongue, at a position further from the hitch that the strut.

The control device is thus connected to the towing vehicle by a second hitch adjacent the stationary primary hitch. The apparatus preferably is spring loaded to resist sliding movement of the stabilizer tongue relative to the strut in either direction, to assist steering in either direction.

BRIEF DESCRIPTION OF THE DRAWINGS

In the accompanying drawings, which illustrate an exemplary embodiment of the present invention.

DETAILED DESCRIPTION

Figure 1:
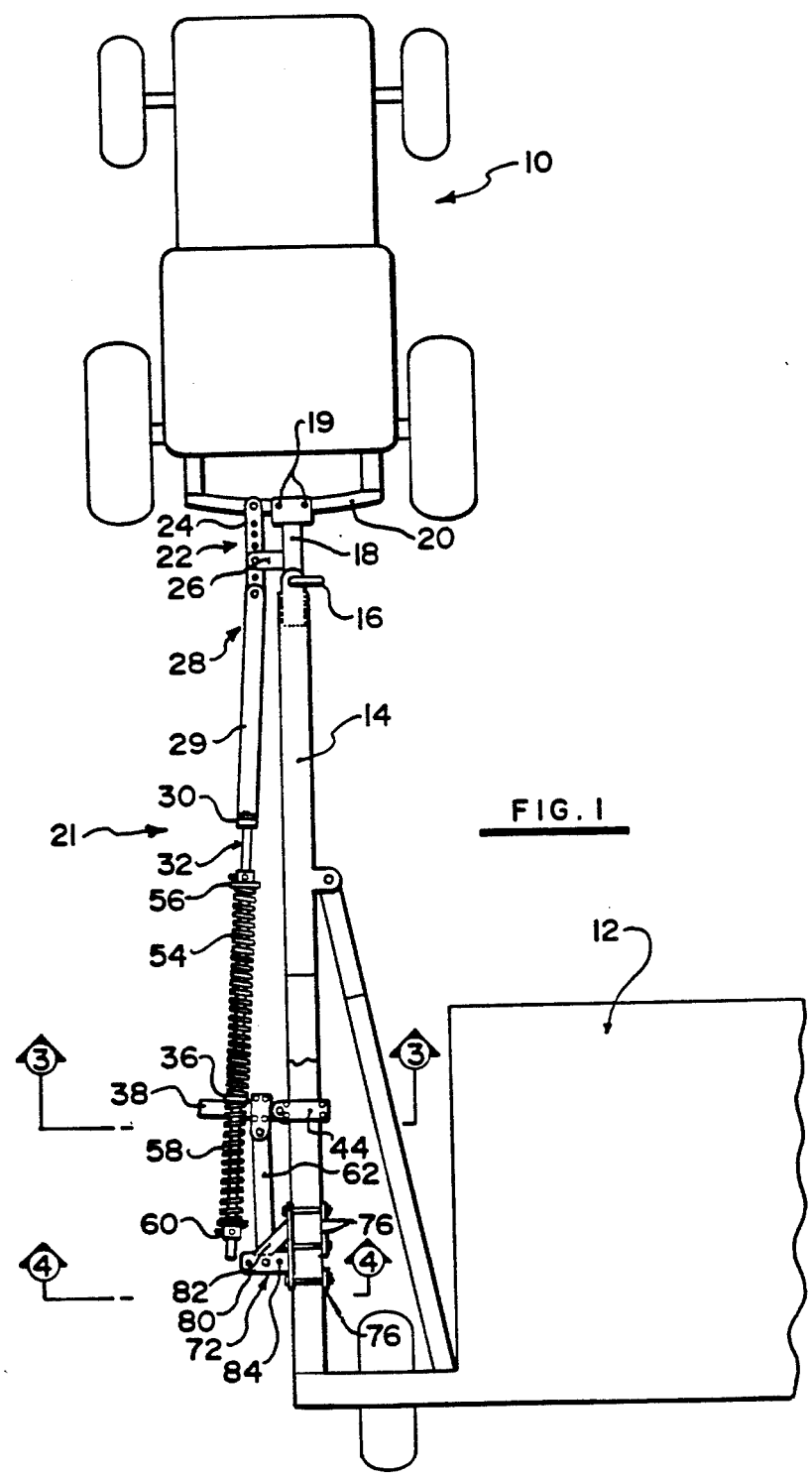
FIG. 1 is a plan view of a device according to the present invention used in association with a pull-type swather.
Figure 2:
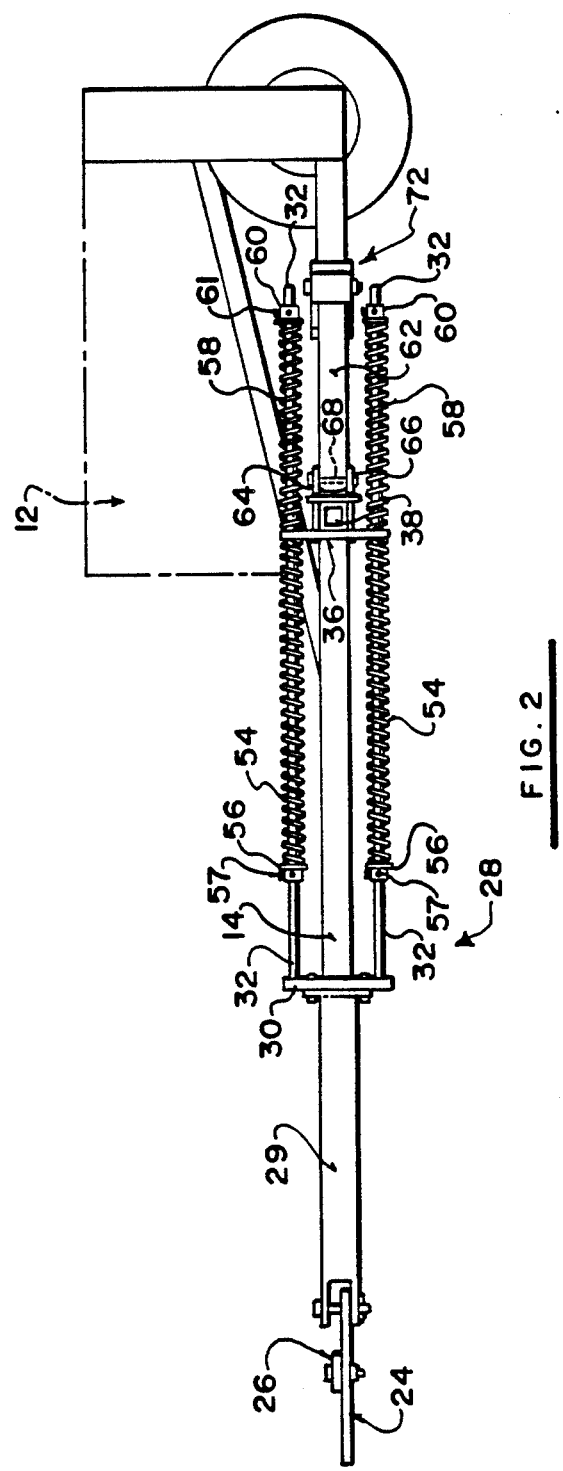
FIG. 2 is an elevational view of the device illustrated in FIG. 1.
Figure 3:
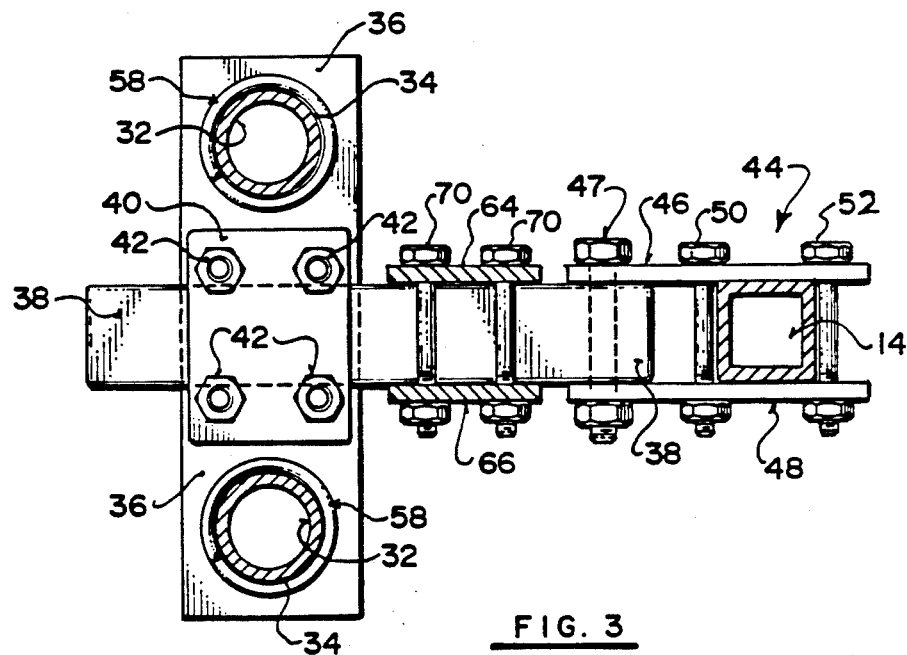
FIG. 3 is a view along line III—III in FIG. 1.
Figure 4:
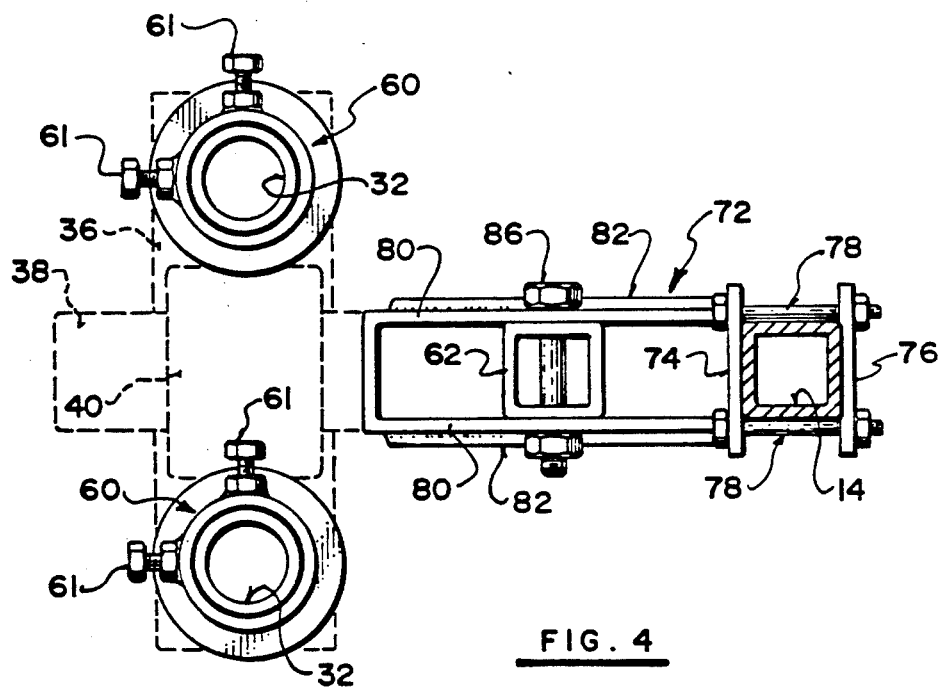
FIG. 4 is a view along line IV—IV in FIG. 1.

Referring to the accompanying drawings, there is illustrated a tractor 10 pulling a swather 12, offset to the right of the swather tongue 14. The tongue is connected by a pin 16 to a swing draw bar 18 fixed in place on the draw bar bracket 20 by pins 19.

To stabilize the swather against unwanted lateral movements and to improve its steering characteristics, the swather is equipped with a stabilizer device 21. This includes a stabilizer draw bar 22 including bar 24 bolted to the draw bar bracket 20 adjacent the draw bar 18. An L-shaped bar 26 has a short arm pinned to the draw bar 18 by the hitch pin 16 and a longer arm bolted to the bar 24 to complete the second, rigid, stabilizer draw bar to the side of the main implement draw bar 18.

The end of the bar 24 is pinned to a stabilizer tongue 28 that projects to the rear, beside the swather tongue 14. At the front end, the stabilizer tongue is a square tube 29. The back end of the tube 29 is connected to a plate 30 that carries two parallel rods, 32 also projecting to the rear, parallel to the tube 29. The rods pass through respective holes 34 in a vertical plate 36. The plate 36 is mounted on a strut 38 with a clamp plate 40 and four bolts 42 so that the plate can be adjusted along the strut for different applications. The strut 38 is connected to the swather tongue by a bracket 44 consisting of two vertically spaced plates 46 and 48 connected by two bolts 50 on the outside of the tongue and two bolts 52 on the inside of the tongue. Pivotal movement between the bracket 44 and the strut 38 is accommodated by a bolt 47.

Each of the rods 32 carries a coil spring 54 between the plate 36 and a collar 56 clamped to the rod by set screws 57. Behind the plate 36, the rods 32 carry coil springs 58 that are held in place on the rod by collars 60, fixed to the rods by set screws 61.

A beam 62 lies alongside the swather tongue 14, between the tongue and the rods 32. The forward end of the beam is pivotally connected to two vertically spaced plates 64 and 66 by a vertical bolt 68. The plates 64 and 66 are clamped to the strut 38 by four bolts 70. This allows the forward end of the beam 62 to be adjusted along the strut, between the plate 36 and the strut mounting plates 46 and 48.

The back end of the beam 62 is connected to the swather tongue 14 by a bracket 72 that includes a base plate 74 clamped to the side of the tongue by three clamp plates 76 and associated bolts 78. The bracket 72 includes a rectangular section 80 extending to the side from the base plate 74 and two angle braces 82. Three holes 84 are spaced along each of the top and bottom plates of the rectangular section 80 to accommodate a bolt 86 that pins the rear end of the beam 62 to the bracket 72.

In use, the control device balances the torque tending to pull the swather sideways, thus stabilizing the swather against lateral movement to the extended side. The unit also assists in steering, with the movement of the swather relative to the stabilizer tongue tending to compress one or the other sets of springs 54 and 58, increasing resistance to the unwanted movement.

The strength and exact construction of the device will depend on the type and size of the implement on which it is mounted. The mounting itself will vary from implement to implement. The construction of the second hitch on the towing vehicle will also vary depending on the exact construction of the vehicle and the existing draw bar arrangement.

The control device of the present invention is efficient in performing the task for which it was intended. Its design and construction is simple and economical. If properly installed, it is practically trouble free under normal operating conditions.

Numerous modifications may be made to adapt the principal of the present invention to different applications without limiting the invention to the exact construction illustrated and described in the foregoing. The invention is to be considered limited only by the scope of the appended claims.

What is claimed:

1. A towed implement control device for an implement with an implement tongue at one side thereof, the tongue having a hitch for connection to the draw bar of a towing vehicle, said control device comprising:
   a strut pivotally mounted on the implement tongue and projecting laterally from the tongue to a side thereof opposite the implement;
   a control tongue extending along the side of the implement tongue opposite the implement and slideably connected to the strut;
   control hitch means pivotally connecting the control tongue to the towing vehicle at a position adjacent the draw bar hitch;
   spring means acting between the control tongue and the strut to resist relative sliding movement of the control tongue and the strut; and
   a beam pivotally connected to the strut and pivotally connected to the implement tongue, at a position further from the hitch than the strut.

2. A control device according to claim 1 wherein the spring means include springs acting to resist movement of the strut towards the control hitch means.

3. A device according to claim 2 wherein the spring means further include springs acting to resist movement of the strut away from the control hitch means.

4. A device according to claim 1 including a bracket pivotally mounting the strut on the implement tongue.

5. A device according to claim 4 including a second bracket pivotally mounting the beam on the implement tongue.

6. A device according to claim 5 wherein the second bracket is adjustable to adjust the pivotal connection of the beam to the implement tongue towards and away from the implement tongue.

7. A device according to claim 6 including means adjustably connecting the beam to the strut.

8. An apparatus according to claim 1 including a plate secured to the strut and projecting above and below the strut, the control tongue including a pair of rods extending slideably through respective holes in the plate, above and below the strut.

9. A device according to claim 8 including means connecting the rods at leading ends thereof.

10. A device according to claim 9 wherein the spring means include a coil spring on each rod, between the plate and the control hitch means, and a collar fitted on the rod between the spring and the control hitch means.

11. A device according to claim 10 including a second coil spring on each rod on an opposite side of the plate and a collar retaining the second coil spring on the rod.

12. A device according to claim 11 wherein each collar is adjustable along the associated rod for adjusting the compression of the associated spring.

13. A device according to claim 12 wherein the plate is adjustable along the strut.

* * * * *